United States Patent [19]

Matsumoto

[11] 4,228,433

[45] Oct. 14, 1980

[54] INFORMATION DISPLAY POSITION-DEFINING CIRCUIT FOR A CATHODE RAY TUBE

[75] Inventor: Katsumi Matsumoto, Fukaya, Japan

[73] Assignee: Tokyo Shibaura Denki Kabushiki Kaisha, Kawasaki, Japan

[21] Appl. No.: 967,154

[22] Filed: Dec. 6, 1978

[30] Foreign Application Priority Data

Dec. 15, 1977 [JP] Japan ............................... 52/150928

[51] Int. Cl.[3] ............................................. G06F 3/153

[52] U.S. Cl. .................................... 340/748; 340/744; 340/749; 340/791; 340/803; 358/148; 358/183

[58] Field of Search ............... 340/724, 725, 747, 748, 340/749, 744; 358/148, 183

[56] References Cited

U.S. PATENT DOCUMENTS

| | | | |
|---|---|---|---|
| 3,793,483 | 2/1974 | Bushnell | 340/725 X |
| 4,016,362 | 4/1977 | Bristow et al. | 340/724 X |
| 4,019,090 | 4/1977 | Wolff et al. | 340/724 X |
| 4,045,789 | 8/1977 | Bristow | 340/724 X |
| 4,107,665 | 8/1978 | Mayer et al. | 340/747 X |

*Primary Examiner*—David L. Trafton
*Attorney, Agent, or Firm*—Cushman, Darby & Cushman

[57] ABSTRACT

There is provided an information display position-defining circuit comprising a local pulse oscillator reset by a horizontal synchronization pulse; a horizontal pulse counter which is reset by the horizontal synchronization pulse and counts an output pulse from the local pulse oscillator; a vertical pulse counter which is reset by a vertical synchronization pulse and counts the horizontal synchronization pulse; and a character position signal generator for issuing a signal denoting a character display position in response to output signals from the horizontal and vertical pulse counters. The circuit further includes a signal generator designed to selectively send forth a first signal having the same frequency and phase as the horizontal synchronization pulse and a second signal having the same frequency as the first signal, but having a phase different from a first signal; and a comparator for comparing the phases of an output signal from the signal generator and vertical synchronization pulse and, at the same time of synchronization between both phases, selecting the first or second signal.

13 Claims, 22 Drawing Figures

Figures 6A, 6B, 6C, 6D:
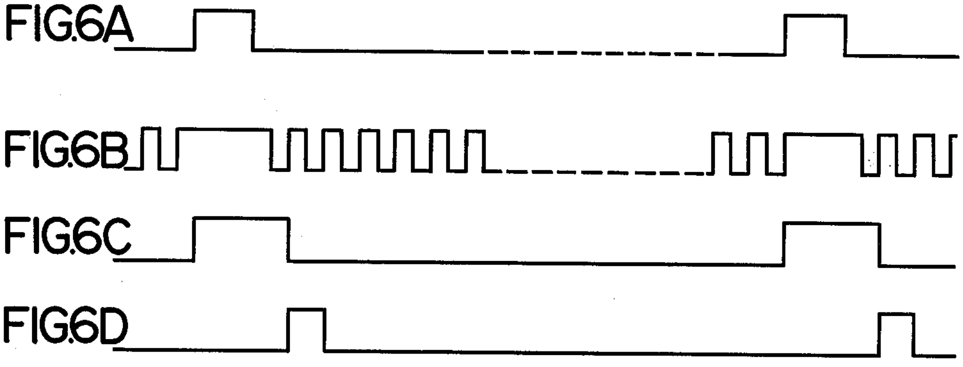

FIG. 1 PRIOR ART
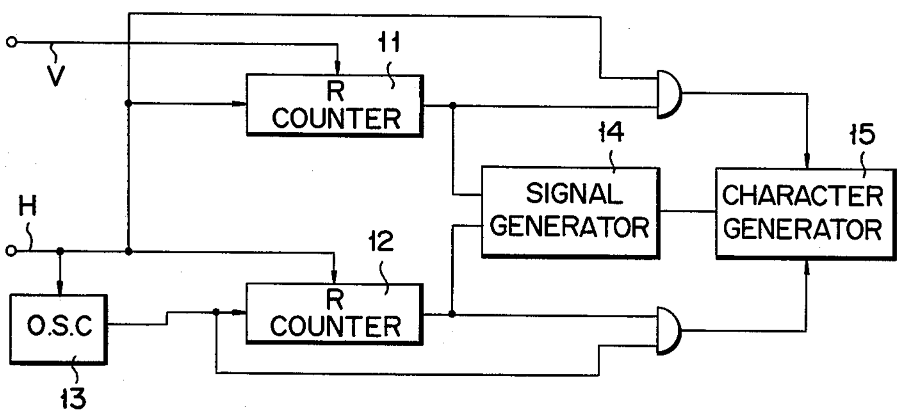
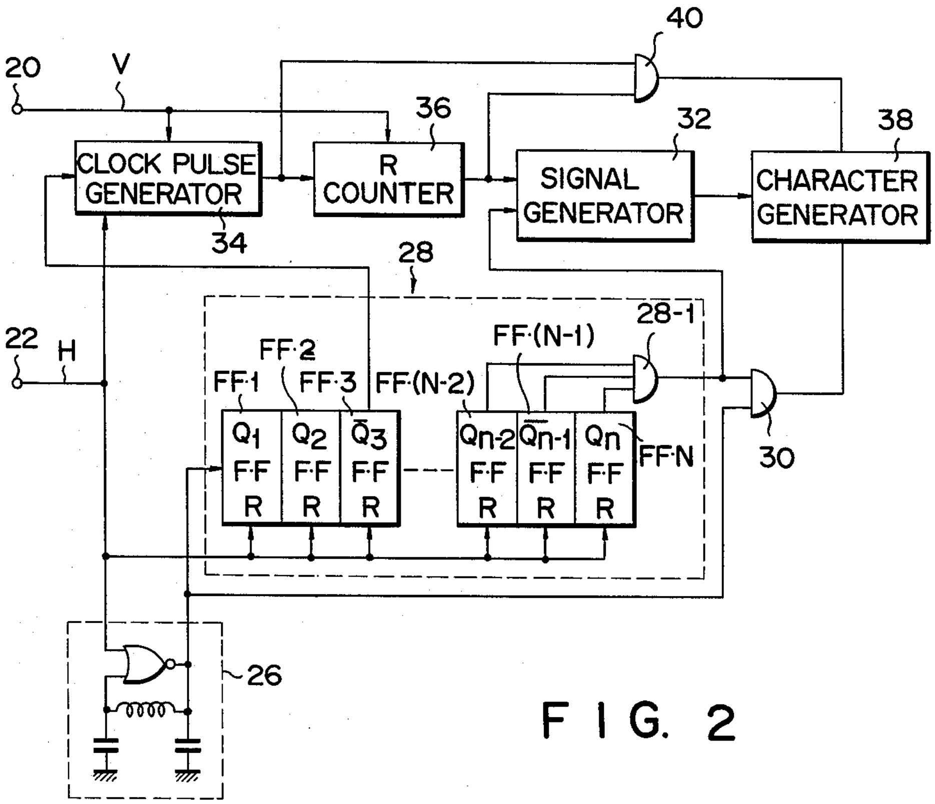
FIG. 2

F I G. 3
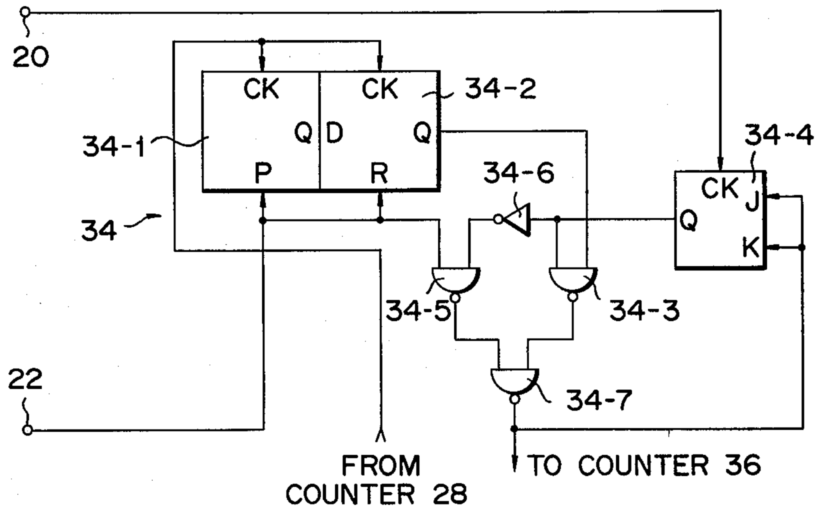
FIG.4A
FIG.4B
FIG.4C
FIG.4D
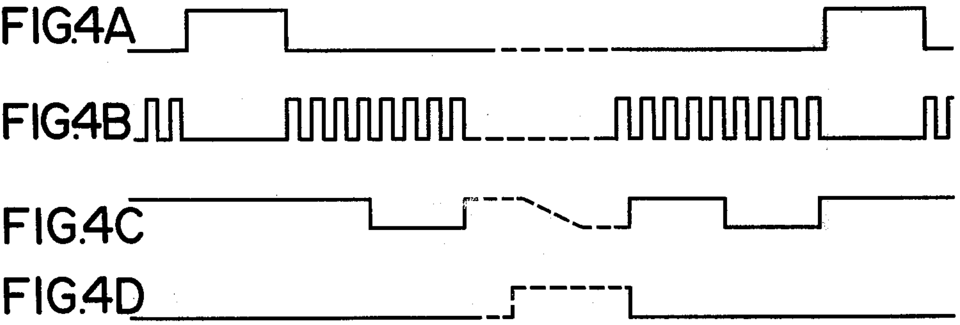
FIG.5A
FIG.5B
FIG.5C
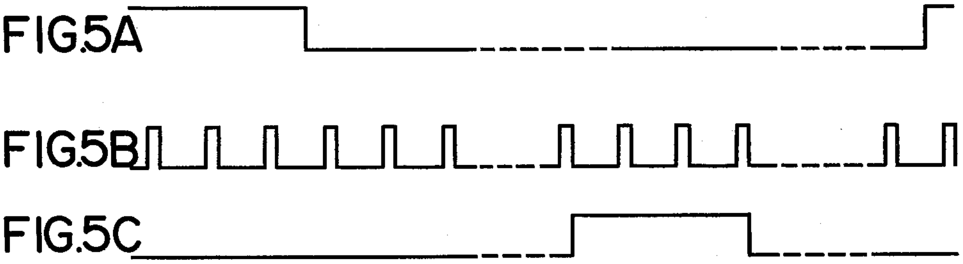

INFORMATION DISPLAY POSITION-DEFINING CIRCUIT FOR A CATHODE RAY TUBE

This invention relates to an information display position-defining circuit for a cathode ray tube which is designed to define, for example, on the screen of a television receiving set a spot at which information on a channel number, time, etc, is to be displayed.

A known display device for displaying characters such as alfa-numerals or figures on the screen of a television receiving set is the type which is designed to display only the character on a television screen with a picture signal blanked or superpose on a picture signal an output signal from a character signal generator received in the television receiving set, thereby indicating a television picture and a character at the same time. To superpose a character signal on that part of a picture signal which corresponds to an information display position, the display device comprises a plurality of character elements arranged in the matrix form, and a counter for counting pulses corresponding to horizontal and vertical synchronization pulses, thereby specifying the horizontal and vertical positions of a character element section being energized. The character element section is formed of a plurality of memory elements which are arranged in a matrix array and in which data having a logic level of "1" or "0" is to selectively written in order to indicate, for example, a specified character. The display device comprises, as shown in FIG. 1, a counter 11 which is reset by a vertical synchronization pulse V and starts counting horizontal synchronization pulse H, thereby generating a vertical position indicating signal denoting the vertical display range of a display region when making a count falling within a prescribed range; a counter 12 which is reset by a horizontal synchronization pulse H, starts counting local oscillation pulses P issued from a local pulse oscillator 13, and sends forth a horizontal position indicating signal denoting the horizontal range of the display region when making a count falling within a prescribed range; and a display region indicating signal generator 14 responding to position indicating signals from the counters 11 and 12 to define the position of the display region. While the counters 11, 12 generate vertical and horizontal position indicating signals respectively, the horizontal synchronization pulse H and local oscillation pulse P are supplied as vertical and horizontal address signals to a character element section included in a character signal generator 15, thereby reading out a character stored in the character element section and displaying the character in the display region. Data read out of the energized character elements upon receipt of the vertical and horizontal address signals, are indicated in a display position corresponding to the vertical and horizontal address signals. When energized, the character elements project signals denoting the characters allotted thereto on a television screen in a state superposed on a picture signal. Where, in this case, coincidence takes place between a timing in which a vertical synchronization pulse V resets the counter 11 and a timing in which the counter 11 receives a horizontal synchronization pulse being counted, for example, where a trailing edge of the vertical synchronzation pulse coincides with a leading edge of the horizontal synchronization pulse, then a timing in which the counter 11 commences counting is rendered unstable owing to the small variation in timing between the vertical and horizontal synchronization pulses and is delayed or advanced by a length of time required to scan one horizontal line. This is because the vertical and horizontal synchronization pulses are not always synchronized with each other. In such a case, a timing in which a vertical position indicating signal is issued goes beyond or falls behind the specified point of time, resulting in the unstable movement or displacement of a character in a vertical direction.

It is accordingly the object of this invention to provide an information display position-defining circuit for a cathode ray tube which suppresses the displacement of information being displayed solely or together with a picture from a prescribed position on the screen of the cathode ray tube.

According to an aspect of this invention, there is provided an information display position-defining circuit for a cathode ray tube which comprises a local oscillation pulse generator whose operation is controlled by a horizontal synchronization pulse; first signal-generating means for sending forth a horizontal position indicating signal in response to an output signal from the local pulse generator; second signal-generating means which produces a first signal having a prescribed phase relationship with the horizontal synchronization signal during a first operation mode, and a second signal having a different phase from the first signal during a second operation mode, and whose operation mode is changed over when an output signal synchronizes with a vertical synchronization pulse; third signal-generating means for issuing a vertical position indicating signal in response to an output signal from the second signal-generating means; and fourth signal-generating means for producing an information display position-specifying signal corresponding to horizontal and vertical position indicating signals delivered from the first and third signal-generating means.

Figure 8:
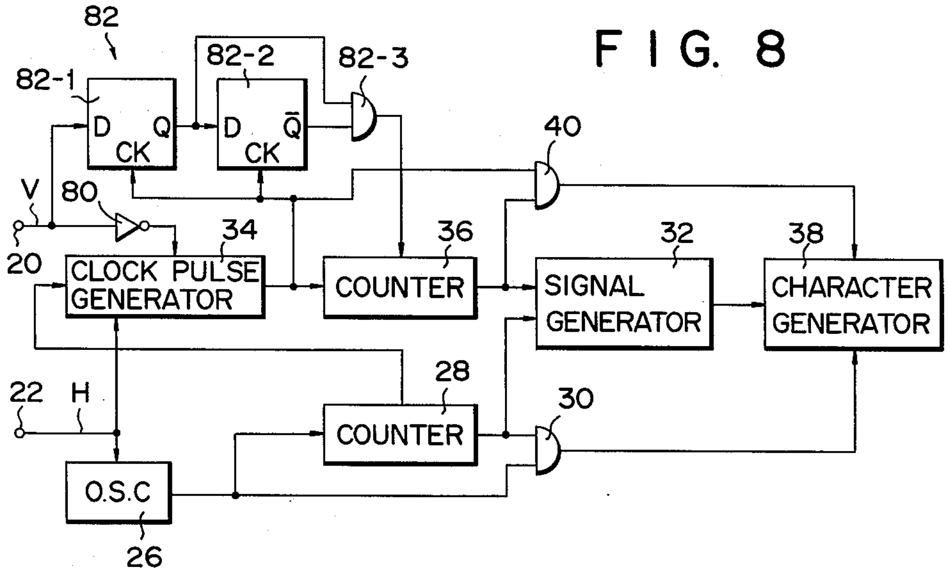
Figures 9A, 9B, 9C, 9D, 9E:
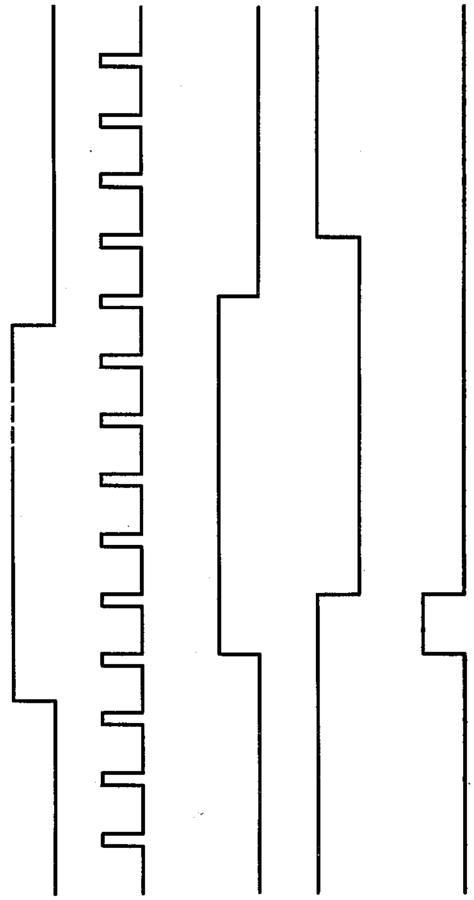

This invention can be more fully understood from the following detailed description when taken in conjunction with the accompanying drawings, in which;

FIG. 1 shows the arrangement of a prior art information display position-defining circuit for a cathode ray tube;

FIG. 2 indicates the arrangement of a data display position-defining circuit for a cathode ray tube according to one embodiment of this invention;

FIG. 3 sets forth a detailed circuit arrangement of a clock pulse generator used with the circuit of FIG. 2;

FIGS. 4AD, 5A–6, 6A–D, 7A, and 7B show the waveforms of signals by way of illustrating the operation of the circuits of FIGS. 2 and 3;

FIG. 8 indicates the arrangement of a data display position-defining circuit for a cathode ray tube according to another embodiment of the invention; and FIGS 9A–E shows the waveforms of signals by way of illustrating the operation of the circuit of FIG. 8.

There will now be described by reference to the accompanying drawing an information display position-defining circuit embodying this invention for a cathode ray tube.

Referring to FIG. 2 showing the arrangement of an information display position-defining circuit according to one embodiment of this invention, vertical and horizontal synchronization pulses V, H are supplied to the corresponding receiving terminals 20, 22 of the circuit. The horizontal synchronization pulse-receiving terminal is connected to a control input terminal of a local oscillator 26 which may be formed of a gated oscillator triggered by a horizontal synchronization pulse or a PLL oscillator phase-locked with a horizontal synchronization pulse. The output terminal of the local oscillator 26 is connected to the input terminal of a counter 28. The counter 28 includes an AND gate 28-1 where input terminal is connected to a series of flip-flop circuits FF1 to FFN whose reset terminals are jointly connected to the horizontal synchronization pulse-receiving terminal 22 of the subject circuit. The input terminal of the AND gate 28-1 is also connected to the Q output terminals of flip-flop circuits FF(N-2), FFN and the $\bar{Q}$ output terminal of a flip-flop circuit FF(N-1). The output terminal of the AND gate 28-1 is connected to one of the input terminals of an AND gate 30, the other input terminal of which is connected to the output terminal of the local oscillator 26. The output terminal of the AND gate 28-1 is also connected to the input terminal of a position signal generator 32 to which a horizontal position signal is supplied.

A clock pulse generator 34 is selectively set to the first or second operation mode when an output pulse from the generator 34 substantially synchronizes with a vertical synchronization pulse, thereby issuing a horizontal synchronization pulse H or a clock pulse having a different phase from the pulse H. The output terminal of the clock pulse generator 34 is connected to the input terminal of a counter 36 which is reset by a vertical synchronization pulse. The output terminal of this counter 36 is connected to one of the input terminals of an AND gate 40, the other input terminal of which is connected to the output terminal of the clock pulse generator 34. The output terminal of the counter 36 is also connected to the input terminal of the position signal generator 32 which is supplied with a vertical position signal. The output terminal of the AND gate 40 is connected to the vertical address signal-receiving terminal of a character signal generator 38 whose horizontal address signal-receiving terminal is connected to the output terminal of the AND gate 30. The position signal-receiving terminal of the character signal generator 38 is connected to the output terminal of the position signal generator 32.

FIG. 3 shows the detailed arrangement of the circuit of the clock pulse generator 34. This clock pulse generator 34 includes two cascade-connected shift registers 34-1, 34-2 whose clock pulse-receiving terminals are supplied with shift pulses delivered from the counter 28. The preset terminal of the first shift register 34-1 and the reset terminal of the second shift register 34-2 are jointly connected to the horizontal synchronization pulse-receiving terminal 22 of the subject information display position-defining circuit. The Q output terminal of the second shift register 34-2 is connected to one of the input terminals of a NAND gate 34-3, the other input terminal of which is connected to the Q output terminal of a J-K flip-flop circuit 34-4. The J-K flip-flop circuit 34-4 has a clock pulse input terminal connected to the pulse reseiving terminal 20 and has its output state reversed only when it receives a clock signal at the clock input terminal while receiving a high level signal at J and K input terminals. The Q output terminal of the J-K flip-flop circuit 34-4 is connected through an inverter 34-6 to one of the input terminals of a NAND gate 34-5, the other input terminal of which is connected to the horizontal synchronization pulse-receiving terminal 22 of the subject information display position-definingcircuit. The output terminals of the NAND gates 34-3, 34-5 are connected to the two input terminals of a NAND gate 34-7 whose output terminal is connected to the J and K input terminals of the J-K flip-flop circuit 34-4 and also to the input terminal of a counter 36.

There will now be described by reference to FIGS. 4A–D and 5A–D showing the waveforms of signals the operation in accordance with the information display position-defining circuit of invention as illustrated in FIG. 2.

An output pulse from the local pulse oscillator 26 which is reset by a horizontal synchronization pulse H shown in FIG. 4A is supplied to the counter 28 in the form of clock pulses indicated in FIG. 4B. After reset by the horizontal synchronization pulse H, the counter 28 counts clock pulses sent forth from the local oscillator 26. The Q output terminal of the flip-flop circuit FF-3 delivers a shift pulse (FIG. 4C) to the first shift register 34-1 of the clock pulse-generator 34. A horizontal position signal (FIG. 4D) denoting the horizontal range of a display region is sent forth from the AND gate 28-1 to the position signal generator 32.

After reset by a vertical synchronization pulse (FIG. 5A), the counter 36 counts output pulses (FIG. 5B) from the clock pulse generator 34, and, as in the case of the counter 28, supplies a vertical position signal (FIG. 5C) denoting the vertical range of the display region to the position signal generator 32. As a result, the position signal generator 32 supplies the character signal generator 38 with a signal representing a display region defined by a horizontal position signal obtained from the counter 28 and a vertical position signal issued from the counter 36. The character signal generator 38 reads out data stored in a character element section corresponding to that of the memory addresses which is specified by a pulse obtained from the local oscillator 26 while a horizontal position signal is delivered from the counter 28, as well as by a pulse sent forth from the clock pulse generator 34 while a vertical position signal is produced from the counter 36, thereby issuing character data.

There will now be described the operation of the clock pulse generator having such a circuit arrangement as shown in FIG. 3. Where the first shift register 34-1 is preset by a horizontal synchronization pulse (FIG. 6A), the resultant preset signal is shifted by a shift pulse (FIG. 6B) supplied from the counter 28, causing an output signal (FIG. 6C) to be sent forth from the Q output terminal of the first shift register 34-1. The Q output signal from the first shift register 34-1 is further shifted in the second shift register 34-2 which produces an output signal as shown in FIG. 6D from the Q output terminal. As seen from FIGS. 6A–D, a horizontal synchronization pulse and a Q output pulse from the second shift register 34-2 have a phase difference substantially equal to one period of a shift pulse supplied from the counter 28.

Where a signal having a logic level of "0" is issued from the Q output terminal of the flip-flop circuit 34-4, the NAND gate 34-3 is disabled, the NAND gate 34-7 is enabled and the NAND gate 34-5, through the inverter 34-6 is enabled. As a result, a horizontal synchronization pulse is conducted to the counter 36 through the NAND gates 34-5, 34-7. Where a signal having a logic level of "1" is obtained from the Q output terminal of the flip-flop circuit 34-4, then the NAND gate 34-5 is disabled, and the NAND gates 34-3, 34-7 are enabled. Consequently, a Q output pulse from the second shift register 34-2 is supplied to the counter 36 through the NAND gates 34-3, 34-7.

Figures 7A, 7B:
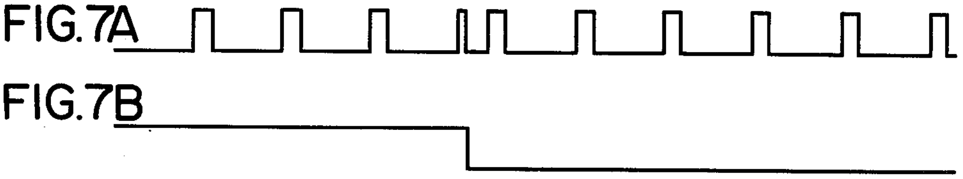

Assume now that coincidence arises between a timing in which a horizontal synchronization pulse (FIG. 7A) is supplied to the counter 36 and a timing in which the counter 36 is reset by a vertical synchronization pulse (FIG. 7B). Where a horizontal synchronization pulse is supplied to the J and K input terminals of the J-K flip-flop circuit 34-4, and the trailing edge of a vertical synchronization pulse is impressed on the clock pulse terminal of the J-K flip-flop circuit 34-4, then the operation mode of the J-K flip-flop circuit 34-4 in which a "0" level signal has continued to be issued is changed over to that in which a "1" level signal is generated. Consequently, the NAND gate 34-5 is disabled, and the NAND gates 34-4, 34-7 are enabled. An output pulse (FIG. 7A) from the second shift register 34-2 having a different phase from the horizontal synchronization pulse is conducted to the counter 36 through the NAND gates 34-3, 34-7. Therefore, the counter 36 is little likely to be reset by a succeeding vertical synchronization pulse in synchronization with a pulse which has been supplied to the counter 36. Later where, for example, a television picture signal is changed by switching the channels and then coincidence takes place between a timing in which an output pulse from the second shift register 34-2 is delivered to the counter 36 and a timing in which a vertical synchronization pulse resets the counter 36, then the output state of the J-K flip-flop circuit 34-4 is reversed, causing a horizontal synchronization pulse to be supplied to the counter 36 through the NAND gate 34-7.

There will be described the operation of an information display position defining circuit according to another embodiment of this invention by reference to FIG. 8 showing the arrangement of the circuit. The parts of FIG. 8 the same as those of FIG. 2 are denoted by the same numerals, description thereof being omitted.

The circuit of FIG. 8 differs from that of FIG. 2 in that a vertical synchronization pulse is supplied to the clock pulse generator 34 through an inverter 80, and the counter 36 is not directly reset by a vertical synchronization pulse V, but by a reset pulse issued from a reset pulse generator 82.

The reset pulse generator 82 comprises two cascade-connected shift registers 82-1, 82-2 whose clock input terminals receive a clock pulse issued from the clock pulse generator 34; and an AND gate 82-3 whose input terminals are connected to the Q output terminal of the shift register 82-1 and the $\overline{Q}$ output terminal of the shift register 82-2. The D input terminal of the shift register 82-1 is connected to the vertical synchronization pulse-receiving terminal 20 of the subject information display position-defining circuit. The D input terminal of the shift register 82-2 is connected to the Q output terminal of the shift register 82-1.

Where a vertical synchronization pulse V (FIG. 9A) is applied to the D input terminal of the shift register 82-1, then an output signal (FIG. 9C) is sent forth from the Q output terminal of the shift register 82-1 in response to a clock pulse issued from the clock pulse generator 34. The shift register 82-2 produces a pulse (FIG. 9D) from its $\overline{Q}$ output terminal in response to a Q output signal from the shift register 82-1. As a result, an output pulse (FIG. 9E) is issued from the AND gate 82-3 in synchronization with an output clock pulse from the clock pulse generator 34.

The vertical synchronization pulse V is conducted to the clock pulse generator 34 through an inverter 80. At this time, comparison is made between the phase of the leading edge of the vertical synchronization pulse V and that of an output pulse from the clock pulse generator 34. Where synchronization takes place between for example the leading edge of the vertical synchronization pulse and the horizontal synchronization pulse sent forth from the clock pulse generator 34, then the output state of the J-K flip-flop circuit 34-4 of the clock pulse generator 34 is reversed, causing an output pulse from the clock pulse generator 34 to be issued from the Q output terminal of the second shift register 34-2 (FIG. 3). In this case, an output pulse from the AND gate 82-3 is in synchronization with an output pulse from the second shift register 34-2. After reset by a reset pulse issued from the AND gate 82-3, the counter 36 unfailingly counts clock pulses supplied from the clock pulse generator 34.

Since a logic level changes at higher speed in the leading edge of the vertical synchronization pulse than in the trailing edge thereof, and the leading edge has a stable phase relationship with respect to the horizontal synchronization pulse the circuit of FIG. 8 offers greater advantage than that of FIG. 2 in examining whether synchronization takes place between the vertical synchronization pulse and an output pulse from the clock pulse generator 34.

This invention has been described by reference to the foregoing embodiments. However, the invention is not limited thereto. In the circuit of FIG. 2, a shift pulse obtained from the counter 28 is issued from the $\overline{Q}$ output terminal of the flip-flop circuit FF3. Where it is desired to use a shift pulse having a different period or phase from the shift pulse used in the embodiment, then it is possible to obtain a desired shift pulse by using one of the flip-flops FF-1 to FF-N or by properly combining a plurality of the flip-flops. In this case, it is preferred that an output shift pulse from the counter 28 be chosen to have such period as causes a difference between the phases of the horizontal synchronization pulse and the Q output pulse from the second shift register 34-2 larger than the extent to which the relative phase between the vertical synchronization pulse the horizontal synchronization pulse may vary.

According to the circuit of FIG. 8, the counter 36 is supplied with an output pulse from the clock pulse generator 34. Instead, it is possible to supply the horizontal synchronization pulse H to the counter 36. Further, a signal having a different phase from the horizontal synchronization pulse can be obtained without using the shift registers 34-1, 34-2 by deriving output signals from the selected flip-flops of the counter 28 through a gate circuit.

What is claimed is:

1. An information display position-defining circuit for a cathode-ray tube comprising:

a local pulse oscillator producing an output pulse train in response to a horizontal synchronization pulse;

first signal-generating means for producing a horizontal position signal corresponding to an output signal from the local pulse oscillator;

second signal-generating means for generating a first signal having a prescribed phase relationship with the horizontal synchronization pulse during a first operation mode and for generating a second signal having a different phase from the first signal during a second operation mode;

operation mode-setting means connected to receive an output signal from said second signal generating means and a vertical synchronization pulse for producing an output signal to change over the operation mode of said second signal generating means when substantial synchronization arises between the output signal from said second signal generating means and the vertical synchronization pulse;

third signal-generating means for producing a vertical position signal in response to an output signal from the second signal-generating means; and fourth signal-generating means for producing an information display position-specifying signal corresponding to the horizontal position signal and vertical position signal delivered from the first and third signal generators.

2. The information display position-defining circuit according to claim 1, wherein:

the first signal-generating means comprises a counter circuit for producing the horizontal position signal at a first output terminal, and for producing a shift pulse obtained by dividing the frequency of an output signal from the local pulse oscillator at a second output terminal, said counter being reset by the horizontal synchronization pulse; and the third signal-generating means comprises a counter circuit which is reset by the vertical synchronization pulse:

3. The information display position-defining circuit according to claim 1, wherein:

the second signal-generating means comprises:

a pulse-generating section for generating, in response to the horizontal synchronization pulse, an output pulse having a phase difference from said horizontal synchronization pulse which is defined by an output shift pulse from the first signal-generating means, and a signal-selecting section which receives an output pulse from the pulse generating section and the horizontal synchronization pulse and supplies one of said pulses to the third signal-generating means in accordance with the operation mode; and said operation mode-setting means is connected to receive an output signal from said signal-selecting section and the vertical synchronization signal for detecting coincidence between the output pulse of the signal-selecting section and the resetting of the third signal-generating means by a signal corresponding to the vertical synchronization pulse, and at the time of said detection, supplying an output signal to the signal-selecting section to change over its operation mode.

4. The information display position-defining circuit according to claim 3, wherein the pulse-generating section of the second signal-generating means comprises a shift register circuit including cascade-connected shift registers which are operated by an output shift pulse from the first signal-generating means, and carries out the shifting of an input signal upon receipt of the horizontal synchronization pulse at the input terminal.

5. The information display position-defining circuit according to claim 3 or 4, wherein the signal-selecting section comprises:

a first NAND gate supplied with output signals from the pulse-generating section and operation mode-setting means;

a second NAND gate supplied with a signal inverted from an output signal from the operation mode-setting means and the horizontal synchronization pulse; and a third NAND gate supplied with output signals from the first and second NAND gates.

6. The information display position-defining circuit according to claim 3 or 4, wherein the operation mode-setting means is constituted by a J-K flip-flop circuit whose J and K input terminals are connected to the signal-selecting section, and whose clock input terminal is supplied with the vertical synchronization pulse.

7. The information display position-defining circuit according to claim 1, wherein:

the first signal-generating means comprises a counter circuit for producing, the horizontal position signal at a first output terminal, and for producing a shift pulse obtained by dividing the frequency of an output signal from the local pulse oscillator at a second output terminal, said counter being reset by the horizontal synchronization pulse; and the third signal-generating means comprises a pulse-generating section for generating an output pulse synchronized with an output signal from the second signal-generating means and a counter section which is reset by an output pulse from the pulse-generating section.

8. The information display position-defining circuit according to claim 7, wherein the pulse-generating section of the third signal-generating means comprises a shift register circuit whose clock input terminal is supplied with an output signal from the second signal-generating means and which includes two cascade-connected shift registers for shifting the vertical synchronization pulse; and an AND gate supplied with an output signal from the preceding shift register and a signal inverted from an output signal from the succeeding shift register.

9. The data display position-defining circuit according to claim 8, wherein:

the second signal-generating means comprises:

a pulse-generating section for generating, in response to the horizontal synchronization pulse, an output pulse having a phase difference from said horizontal synchronization pulse which is defined by an output shift pulse from the first signal-generating means, and a signal-selecting section which receives an output pulse from the pulse generating section and the horizontal synchronization pulse and supplies one of said pulses to the third signal-generating means in accordance with the operation mode; and said operation mode-setting means is connected to receive an output signal from said signal-selecting section and the vertical synchronization signal for detecting coincidence between the output pulse of the signal-selecting section and the resetting of the third signal-generating means by a signal corresponding to the vertical synchronization pulse, and at the time of said detection, supplying an output signal to the signal-selecting section to change over its operation mode.

10. The data display position-defining circuit according to claim 9, wherein the pulse-generating section of the second signal-generating means comprises a shift register circuit including cascade-connected shift registers which are operated by an output shift pulse from the first signal-generating means, and carries out the shifting of an input signal upon receipt of the horizontal synchronization pulse at the input terminal.

11. The data display position-defining circuit according to claim 8 or 9, wherein the signal-selecting section comprises:

a first NAND gate supplied with output signals from the pulse-generating section and operation mode-setting means;

a second NAND gate supplied with a signal inverted from an output signal from the operation mode-setting means and the horizontal synchronization pulse; and a third NAND gate supplied with output signals from the first and second NAND gates.

12. The data display position-defining circuit according to claim 8 or 9, wherein the operation mode-setting means is constituted by a J-K flip-flop circuit whose J and K input terminals are connected to the signal-selecting section, and whose clock input terminal is supplied with the vertical synchronization pulse.

13. An information display position-defining circuit for a cathode-ray tube comprising:

a local pulse oscillator producing an output pulse train in response to a horizontal synchronization pulse;

first signal-generating means for producing a horizontal position signal corresponding to an output signal from the local pulse oscillator;

second signal-generating means for generating a first signal having a prescribed phase relationship with the horizontal synchronization pulse during a first operation mode and for generating a second signal having a different phase from the first signal during a second operation mode;

operation mode-setting means connected to receive an output signal from said second signal-generating means and a vertical synchronization pulse and for producing an output signal to change over the operation mode of said second signal-generating means when substantial synchronization arises between the output signal from said second signal-generating means and the vertical synchronization pulse;

third signal-generating means for producing a vertical position signal in response to a horizontal synchronization pulse;

fourth signal-generating means connected to said second signal-generating means to supply an output signal synchronized with an output signal from said second signal-generating means to said third signal-generating means to reset the third signal-generating means; and fifth signal-generating means for producing an information display position-specifying signal corresponding to the horizontal position signal and vertical position signal delivered from the first and third signal generating means.

* * * * *